United States Patent [19]

Dagard

[11] Patent Number: 4,684,494

[45] Date of Patent: Aug. 4, 1987

[54] ULTRAFILTRATION DEVICE IN A PRESSURIZED WATER NUCLEAR REACTOR

[75] Inventor: Philippe Dagard, Marly le Roi, France

[73] Assignee: Framatome & Cie., Courbevoie, France

[21] Appl. No.: 653,805

[22] Filed: Sep. 24, 1984

[30] Foreign Application Priority Data

Sep. 23, 1983 [FR] France ............................... 83 15130

[51] Int. Cl.$^4$ ............................................ G21C 19/30
[52] U.S. Cl. .................................... 376/313; 210/650; 210/772; 210/778; 210/779; 210/798
[58] Field of Search ................. 376/313, 315; 210/650, 210/779, 772, 778, 798

[56] References Cited

U.S. PATENT DOCUMENTS

| | | | |
|---|---|---|---|
| 3,890,233 | 6/1975 | Gischel | 376/313 X |
| 4,043,864 | 8/1977 | Heitmann | 376/315 |
| 4,105,547 | 8/1978 | Sandblom | 210/650 |
| 4,251,377 | 2/1981 | Schleinitz | 210/650 X |
| 4,276,177 | 6/1981 | Smith | 210/650 X |

FOREIGN PATENT DOCUMENTS

| | | | |
|---|---|---|---|
| 2422777 | 11/1974 | Fed. Rep. of Germany | 210/650 |
| 3022679 | 1/1982 | Fed. Rep. of Germany | 210/650 |
| 2217051 | 9/1974 | France | 210/650 |
| 47807 | 7/1978 | Japan | 210/650 |
| 121395 | 9/1979 | Japan | 376/313 |

OTHER PUBLICATIONS

Post, Roy G., "Waste Management," ANS Topical Meeting, Symposium on Waste Management, Feb. 23-26, 1981, Tucson, Arizona, pp. 789-810.

*Primary Examiner*—John F. Terapane
*Assistant Examiner*—John S. Maples
*Attorney, Agent, or Firm*—Pollock, Vande Sande & Priddy

[57] ABSTRACT

Process and apparatus for ultrafiltration of the cooling water of a pressurized water nuclear reactor, during operation of the reactor. A fraction of the flow of pressurized water is withdrawn continuously in at least one cold branch (8) of the primary circuit (2). This withdrawn water is circulated, while it is still at the temperature and pressure of the primary circuit (2), in contact with the entry face of an ultrafiltration wall (40). The filtrate is withdrawn at a pressure which is less than 15 bars lower than the primary water pressure. The concentrate is kept in circulation with the entry face of the wall (40). The wall (40) can consist of an assembly of tubes maintained between two tube plates. The invention applies to pressurized water nuclear reactors whatever the number of primary circuit loops.

4 Claims, 2 Drawing Figures

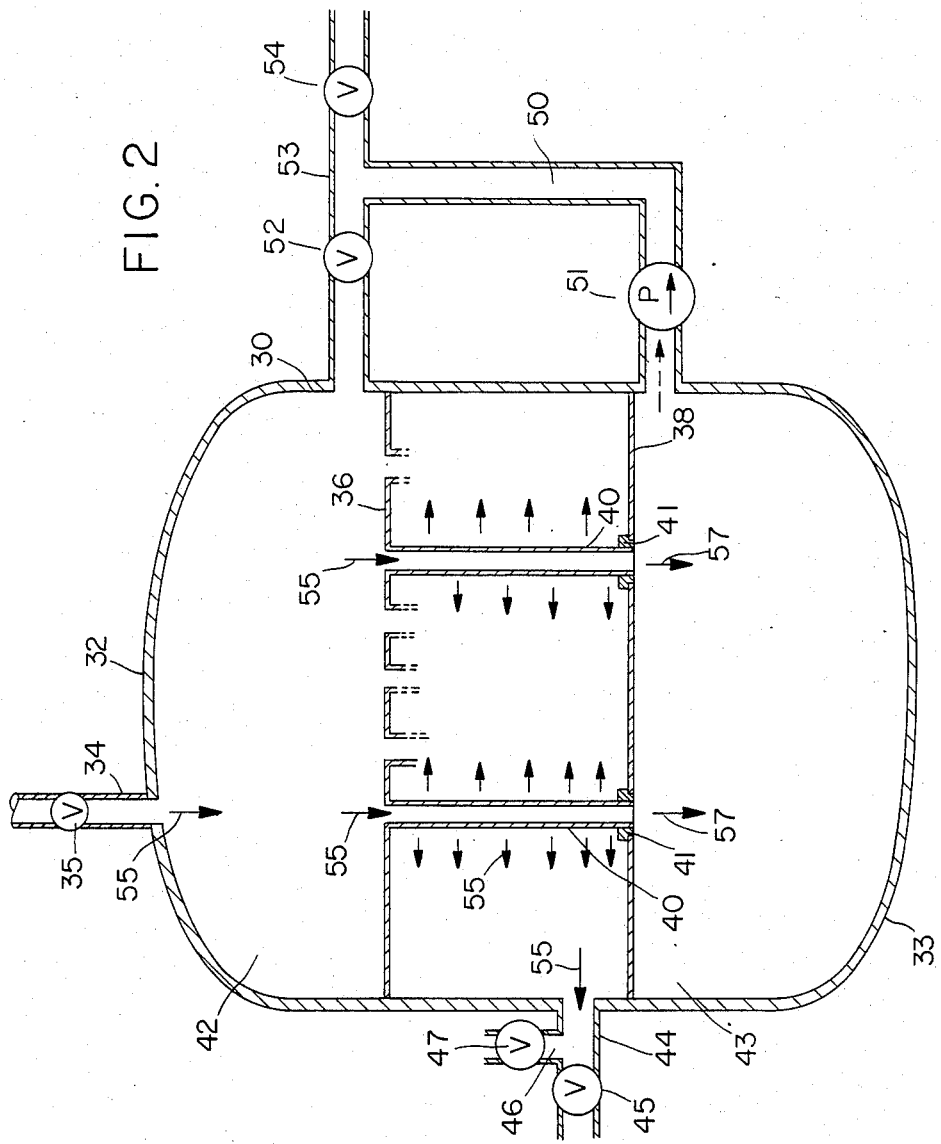

ULTRAFILTRATION DEVICE IN A PRESSURIZED WATER NUCLEAR REACTOR

FIELD OF THE INVENTION

The invention relates to a process for ultrafiltration of the cooling water of a pressurized water nuclear reactor and the corresponding device for ultrafiltration.

BACKGROUND OF THE INVENTION

Pressurized water nuclear reactors incorporate a primary circuit in which water circulates at a pressure close to 155 bars and a temperature close to 300° C. for cooling the reactor core and transferring the heat produced by this core to the steam generator. In the primary circuit of the reactor the pressurized water circulates at a very high flow velocity and its corrosive power is great, since this water contains boric acid employed to modify the reactivity of the reactor core.

During the operation of the reactor, the pressurized water at a high temperature and with a high corrosive power produces particles of oxide (of iron, nickel or cobalt), during its contact with the components of the primary circuit, and entrains these particles at a very high velocity. An appreciable proportion of these particles, consisting mainly of oxide, is in colloidal form, increasing the difficulty of the operations for removing these particles.

Moreover, nuclear reactors operate continuously and are usually stopped only annually, for operations of maintenance and reloading of the reactor fuel. Over such a long period, the quantity of particles present in the primary water would reach too high a level and it is necessary to remove these particles during the operation of the reactor, in order to reduce the radioactivity of the primary fluid. In fact, through the action of radiation, during their passage through the core fuel assemblies, the oxide particles give rise to highly radioactive isotopes. The harmful nature of these phenomena is further increased by the fact that the radioactive corrosion products can accumulate at certain particular places in the circuit, creating sites of high radioactivity.

The upper limit of the content of solid constituents in suspension in the primary water has therefore been fixed at a value of the order of 1 ppm ($10^{-6}$).

PRIOR ART

Processes and devices permitting the purification of the primary circuit water during the operation of the reactor have therefore been devised. The purification devices are generally placed in the circuit for volumetric and chemical monitoring of the reactor, before the entry of the fluid into the ion exchange resin demineralization units which form a part of this circuit. The general function of the circuit for volumetric and chemical monitoring is to regulate the quantity of water in the primary circuit and the chemical composition of this water.

For this purpose, a demineralization of the primary water is carried out in particular and various conditioning materials are injected into this water.

The primary water purification device, as well as the demineralization units, is arranged in the circuit for volumetric and chemical monitoring, downstream of one or more heat exchangers which bring the primary water to a moderate temperature, of the order of 50° C., and reduce its pressure to 5 bars.

The purification device intended to remove the oxide particles from the primary fluid comprises mechanical filters of the bag type which have a filtering power of 5 to 25 microns. These filters can become blinded, which often results in their replacement having to be undertaken, particularly when the operation takes place with a considerable pressure difference on either side of the filter wall.

Since the filtered radioactive particles accumulate on the walls of the filters, and since these filters are situated outside the reactor safety containment, it is necessary to provide biological protection cells around the filters.

The possibilities of the mechanical filters are, moreover, limited and generally unsuitable for the filtration of the particles present in the primary water of a pressurized water nuclear reactor. In fact, the particle size spectrum of the impurities present in the primary water ranges approximately from 0.1 to several microns, with a maximum proportion of particles in the region of 0.5 micron.

Finally, mechanical filters cannot remove the colloidal particles which have diameters close to 0.1 micron. These particles can only be removed by using an ultrafiltration process.

The known ultrafiltration processes of the prior art are unsuitable, however, for the purification of the cooling water of a pressurized water nuclear reactor.

SUMMARY OF THE INVENTION

The aim of the invention is therefore to offer a process for ultrafiltration of the cooling water of a pressurized water nuclear reactor during the operation of this reactor which permits the removal of the majority of the particles formed in the cooling water with a good yield and without causing a prohibitive accumulation of radioactive products in the filter.

To this end:

a fraction of the flow of water circulating under pressure is withdrawn continuously in at least one cold branch of the primary circuit;

this withdrawn water is circulated, while it is still at the temperature and pressure of the primary circuit, in contact with the entry face of an ultrafiltration wall;

the filtrate is withdrawn from the side of the exit face of the ultrafiltration wall, at a pressure which is less than 15 bars lower than the primary water pressure; and the concentrate is kept in circulation with the entry face of the ultrafiltration wall.

BRIEF DESCRIPTION OF THE DRAWINGS

In order that the invention may be more clearly understood, a description will be given by way of example with reference to the attached drawings, of the embodiment of the process for ultrafiltration according to the invention, employing an ultrafilter inserted in the circuit for volumetric and chemical monitoring of the reactor.

FIG. 2 is a view in cross section of a device for ultrafiltration which may be employed for operating the process according to the invention.

DETAILED DESCRIPTION

Figure 1:
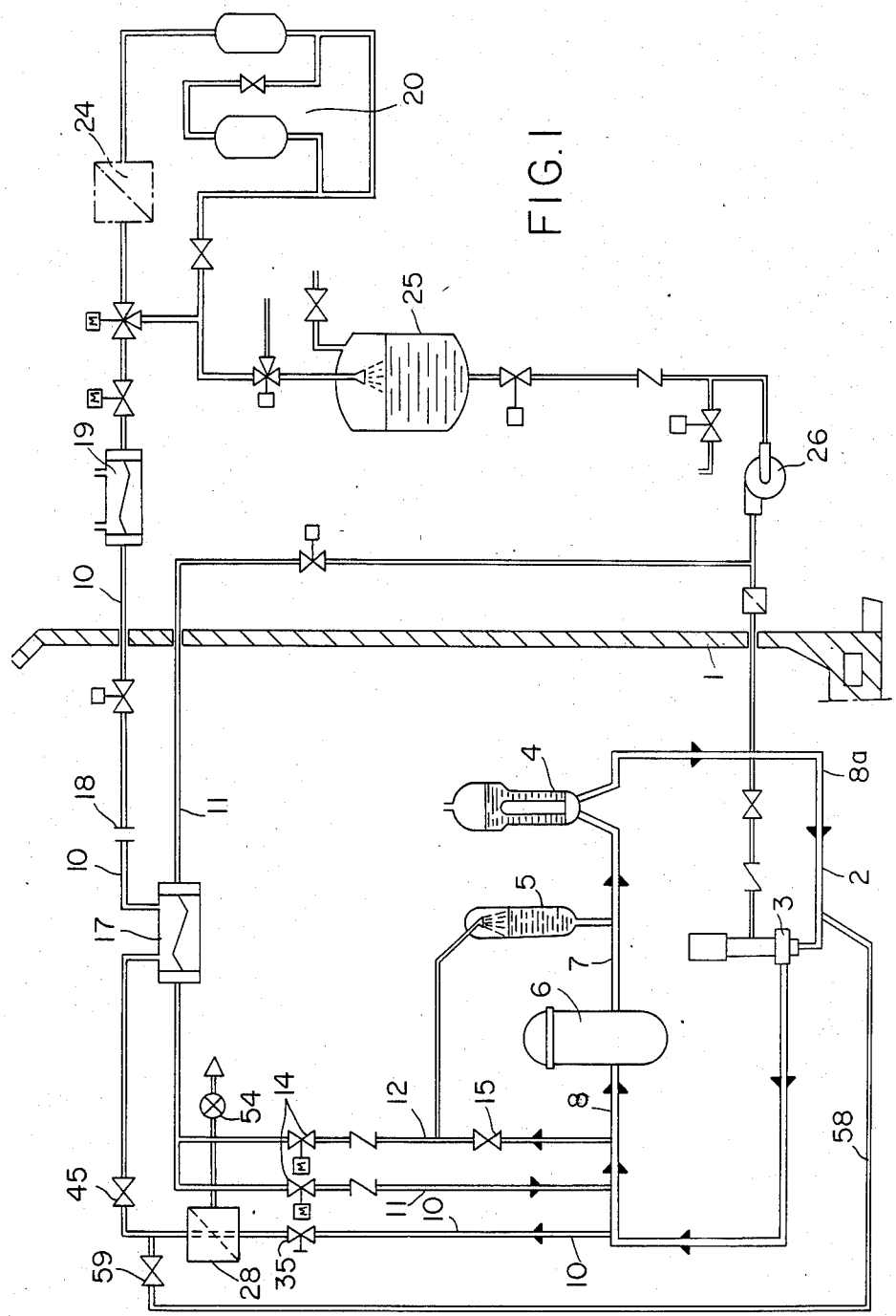
FIG. 1 is a schematic diagram of the primary circuit and of the circuit for volumetric and chemical monitoring of a pressurized water nuclear reactor.

FIG. 1 shows a part of the safety containment 1 of a pressurized water nuclear reactor enclosing the primary circuit 2 one branch of which is shown comprising a primary pump 3, a steam generator 4 and the pressurizer 5. The water heated in contact with a core leaves the vessel 6 through the hot branch 7 and the water cooled in the steam generator 4 re-enters the vessel 6 through the cold branch 8.

The primary circuits of pressurized water nuclear reactors generally incorporate three or four identical loops each comprising a steam generator.

In FIG. 1 can be seen the volumetric and chemical circuit of the reactor, branching off from the cold branch 8 of the primary circuit.

This volumetric and chemical circuit comprises a pipeline 10 for withdrawing primary water, a pipeline 11 for recycling the water withdrawn, after treatment and a pipeline 12 connected to the pressurizer.

Valves 14 and 15 enable one part or another of the circuit for volumetric and chemical monitoring to be brought into operation.

The pipeline for withdrawal 10 is connected to the secondary part of a regenerator exchanger 17, through whose primary passes the recycled water via of the pipeline 11.

Downstream of the regenerator exchanger 17, the pipeline 10 communicates with a pressure reducing device 18, then passes downstream of this pressure reduction device 18 through the wall 1 of the safety containment. Outside the safety containment, the pipeline 10 communicates in turn with an exchanger 19 and the demineralization unit 20.

The primary water withdrawn is therefore cooled and depressurized, so that upstream of the demineralization unit 20 it is at a temperature to 50° C. and a pressure of 5 bars.

Shown in broken lines in a prior art mechanical filter 24, arranged outside the safety containment, upstream of the demineralization unit 20, and therefore receiving water at a moderate temperature and low pressure.

After its purification, its demineralization and various other treatments comprising the addition of conditioning products, the primary fluid is conveyed to a storage tank 25 from which it can be recycled into the primary circuit through the pipeline 11 and with the aid of an injection pump 26.

The recycled primary water rejoins the cold branch 8 at a pressure and a temperature close to those of the water circulating therein.

A fraction of the flow of the primary water can thus be withdrawn and treated outside the safety containment.

The fact that the mechanical purification filter 24 is arranged just upstream of the demineralization unit has, in particular, the disadvantage that the purification operation is being carried out on a fluid at a temperature which is responsible for a poor yield of this purification operation. In fact, the corrosion particles produced in the primary fluid have a solubility which is inversely proportional to the temperature. A low fluid temperature is therefore accompanied by a poor yield of the filtration operation. Moreover, the filter collects radioactive particles, with the result that this filter, which is arranged outside the sefety containment, is found to be highly contaminated after the reactor has been operating for some time.

To make use of the process according to the invention, an ultrafiltration unit 28, constructed as will be described with reference to FIG. 2, is therefore arranged in the withdrawal pipeline 10 of the circuit for volumetric and chemical monitoring, inside the safety containment 1 and upstream of the regenerator exchanger 17.

FIG. 2 shows an ultrafiltration device indicated in a general manner by the reference 28.

This ultrafiltration device comprises a cylindrical enclosure 30 with a vertical axis, closed by two dished ends 32 and 33.

Through the upper end 32 passes a pipeline 34 in which is placed a valve 35. The pipeline 34 permits water to be purified to enter the ultrafiltration device.

Two tube plates 36 and 38 are arranged transversely relative to the cylindrical enclosure 30 for the filter and are welded at their periphery on the inner surface of this enclosure 30 with a spacing depending on the height of the enclosure 30.

Between the two tube plates 36 and 38, a large number of tubes 40 are arranged forming the filtration wall of the ultrafilter.

The tubes 40 have a composite wall formed by an overlay of homogeneous porous materials. The microporous layer serving as a separation membrane of the ultrafilter is supported by macroporous inorganic substrates of a tubular shape. These support layers provide the tubes 40 with good mechanical properties.

The microporous ultrafiltration layer which is very thin consists of metal oxides having a high chemical and thermal stability. This microporous texture of metal oxides has a thickness of a few tens to several thousand angstroms.

The macroporous support membranes are made of carbon or a ceramic material such as alumina.

The tubes 40 are joined to the upper tube plate 36 by a welded joint of the ceramic/metal type, which is completely rigid.

The lower half of the tubes 40, on the other hand, is simply inserted in a leakproof manner but free to move axially in the indium seals 41.

The tube plates 36 and 38 and the tubes 40 divide the inner volume of the enclosure of the ultrafiltration device into two parts, the primary part which comprises the upper zone 42 and the lower zone 43 of the enclosure and the inner volume of the tubes 40 and the secondary part which comprises the volume of the enlcosure between the tube plates 36 and 38 which is outside the tubes 40.

The secondary part of the filter is joined to a pipeline 44 in which a valve 45 is fitted. A pipeline 46 incorporating a valve 47 is arranged branching from the pipeline 44 upstream of the valve 45.

A circuit 50 permits the liquid to be recycled from the lower compartment 43 of the primary part of the ultrafilter to the upper compartment 42 of this primary part. This circuit 50 incorporates a circulation pump 51 and a valve 52 permitting the recycling to be started or stopped.

A pipeline 53 in which is arranged a valve 54 is also placed branching from the circuit 50 between the circulation pump 51 and the stop valve 52.

In the case where the ultrafilter 28 is fitted in the circuit for volumetric and chemical monitoring as shown in FIG. 1, the ultrafilter entry 34 and exit 44 pipelines are joined to the withdrawal pipeline of the circuit for volumetric and chemical monitoring so that the water withdrawn crosses the filter in the direction shown by the solid arrows 55.

The flow of pressurized water and the part of the volumetric and chemical circuit in which the ultrafilter 28 is inserted are designed so that a pressure difference of 5 bars exists between the fluid entering the pipeline 34 and the fluid leaving in the pipeline 44.

The ultrafiltration walls formed by the tubes 40 which can withstand a pressure difference of up to 15 bars are therefore employed fairly far from their upper pressure limit.

In the case of a pressurized water nuclear reactor with a power of 1300 MW, two devices 28 such as shown in FIG. 2, arranged in parallel, are employed. Each of the two devices is capable of processing the nominal flow of the reactor and in particular both filters are capable of processing the maximum flow to permit the maintenance of one device while the other remains in operation. Each 2of these devices comprises approximately 180 tubes 6 mm in diameter. These tubes are made of alumina coated internally with a microporous oxide layer.

The metal structure unit of the ultrafilter in which the tubes are arranged is made of stainless steel.

The fact that the tubes are rigidly fixed to the tube plate 36 at only one of their ends and are free to expand axially because of not being fixed to the plate 38 removes the risk of appearance of harmful stresses in these tubes when the device operates at a high temperature. Nevertheless, the passage of the tubes through the plate 38 is leakproof by virtue of the indium seal 41.

The filter structure is strengthened with antivibration spacer-plates (not shown).

A description will now be given of the operation of the device shown in FIG. 2 for purifying the primary water of a nuclear reactor, the water being withdrawn by a pipeline 10 from the circuit for volumetric and chemical monitoring in which the device 28 is inserted.

During the operation of the filtration device, the valves 35 and 45 in the pipelines joining the device 28 to the pipeline 10 of the circuit for volumetric and chemical monitoring are open. The primary water to be purified enters the ultrafilter by the upper compartment 42 of its primary part. Given the position of the ultrafilter 28 in the circuit for volumetric and chemical monitoring, the water enters the device 28 at a pressure of the order of 155 bars and at a temperature close to 300° C. This water is distributed into the tubes 40 in the region of the tube plate 36 and as it passes through the tubes 40 the 5 bar pressure drop created between the secondary part and the primary part of the ultrafilter causes a large proportion of the primary water to pass through the microporous layer covering the inner wall of the tubes, and then the wall of these tubes, to emerge in the secondary part of the filter where the purified water forming the filtrate is withdrawn through the pipeline 44. The purified water then passes through the circuit for volumetric and chemical monitoring before its return into the primary circuit.

A part of the primary water and all of the impurity particles present in this water, which are retained by the microporous layer are swept to the exit of the tubes 40 to enter the lower compartment 43 of the primary part of the filter. When filtration of the primary water is being carried out, the valve 52 of the circuit 50 is open and the pump 51 operates. On the other hand, the valve 54 of the branch 53 of this circuit is closed. The water containing the impurities forming the concentrate rejected by the filter and entering the compartment 43 is picked up by the pump 51 which passes it through the circuit 50 to recycle this concentrate into the part 42 of the filter.

By adjusting the flow and velocity of the fluid to adequate values, sufficient scouring of the tube walls is obtained to avoid any blockage of these tubes by the particles, even the finest of the particles, given the small overpressure of 5 bars in the primary part of the filter.

In the conditions indicated earlier, for a main filtrate flow of 40 m$^3$/hour the concentrate is circulated in the circuit 50 at a velocity of approximately 5 m/second.

During the filtration operations, the proportion of impurities in the concentrate increases continually because this concentrate is continuously recycled into the compartment 42 and since the water to be purified releases a concentrate containing the impurities which remain in the primary part of the filter.

After the operation has continued for some time, the proportion of impurities in the concentrate is too high for the filter to be capable of operating under good conditions. It is thus necessary to drain the primary part of the filter before this prohibitive concentration of impurities is reached.

To carry out the draining of the filter, the valves 45, 47 and 52 are closed, the valves 35 and 54 being open. The pump 51 continues to operate.

The pipeline 53 is connected by a pipeline to a plant for the treatment of liquid effluents. During the draining of the filter 28 the concentrate is discharged towards this plant for the treatment of liquid effluents. This concentrate is replaced in the filter by primary water which permits the rinsing of the filter walls and of the inner surface of the tubes 40.

The radioactive components present in the concentrate and the rinse water are separated and removed in the effluent processing plant.

A pipeline 58 which incorporates a valve 59 also permits purified water to be reinjected directly at the exit of the filter 28, into the intermediate branch 8a of the primary circuit which is comprised between the steam generator 4 and the primary pump 3. The pressure difference between this intermediate branch 8a and the cold branch 8, corresponding to the pressure drop in the circuit, is 7 bars. The water at the exit of the filter is therefore at a pressure which is higher than the pressure in the intermediate branch 8a since the pressure drop in the filter is only 5 bars. When the pressure drop in the filter 28 is appreciably less than 7 bars, it is therefore possible to reinject purified water into the intermediate branch 8a by opening the valve 59. The purified water which has not been depressurized and which is at a pressure slightly above the pressure in the intermediate branch 8a returns into this intermediate branch 8a by natural circulation. During a stoppage of the power station, when the condensate remains stationary in the filter, particles can be deposited on the walls of the tubes 40, blocking them.

Unblocking of the filter can then be obtained by closing the valves 35, 45 and 54 and opening the valves 47 and 52. The pipeline 46 branching from the pipeline 44 is connected to a supply of demineralized water at a higher pressure than that of the liquid remaining in the primary circuit, with the result that this water passes through the wall of the tubes 40 in the direction opposite to the filtration. This produces the deblocking of the particles remaining on the inner walls of the tubes 40.

The water carrying impurities is next removed as previously by draining, by opening the valve 54 of the pipeline 53 connecting the filter to the plant for the treatment of liquid effluents.

It is seen that the chief advantages of the process and of the device according to the invention are to permit a filtration of particles of any size under very good conditions, the solubility of these impurities in the primary water being then low, to avoid a blocking of the ultrafiltration walls and an accumulation of radioactive products on these filtration surfaces, and to permit all the filter maintenance operations to be carried out in a very simple manner.

The pressure drop between the primary part and the secondary part of the filter may be greater than 5 bars and reach, for example, 12 bars without the mechanical stresses in the tubes being prohibitive and without causing the blinding of the inner walls of these tubes. the pressure drop should not, however, exceed 15 bars, to obtain a satisfactory operation of the filter and to avoid excessively high stresses in the tubes.

The flow values employed in the filter can differ from those which have been given. A filter such as that described can permit the treatment of high flows of primary water, for example from 100 to 200 m³/hour. The combination of two filters in parallel also permits the treatment of a flow which is twice as high, if necessary.

The filter can be of a different shape from that described and the arrangement of the various compartments of this filter can be opposite to that described.

The ceramic tubes can be fixed to the tube plates of the filter in a different manner, for example their two ends can be fixed on these tube plates by means of seals. In all cases, freedom of expansion of these tubes in the axial direction must be ensured. The seals arranged at the ends of the tubes 40 can be made of metals other than indium, for example of silver.

Finally, the process and the device according to the invention can be employed for the purification of the primary water of any nuclear reactor cooled by water under pressure.

I claim:

1. In a pressurized water nuclear reactor having a primary circuit filled with primary cooling water, inside a safety containment, a volumetric and chemical circuit for withdrawing and treating said primary water branching from a cold branch of the primary circuit a part of which, located inside said safety containment, comprises cooling and pressure reducing means, the improvement consisting of an ultrafiltration device arranged inside said safety containment in a withdrawal pipeline of said volumetric and chemical circuit upstream of said cooling and pressure reducing means and comprising an enclosure and an ultrafiltration wall placed inside said enclosure, said withdrawal pipeline being connected to said enclosure of the ultrafiltration device on both sides of said ultrafiltration wall for circulating water withdrawn from said cold branch of said primary circuit in contact with a face constituting an entry face of the wall and for receiving the water separated from impurities by said ultrafiltration wall constituting the filtrate, a recycling circuit being arranged for circulating the concentrate constituted by remaining water not separated from the impurities, in contact with said entry face of said ultrafiltration wall.

2. An ultrafiltration device according to claim 1, wherein said filtrate is recycled in said withdrawal pipeline of said volumetric and chemical circuit at a pressure which is less than 15 bars lower than the pressure of said primary water.

3. An ultrafiltration device according to claim 2, wherein said filtrate is recycled at a pressure which is less than 7 bars into an intermediate branch of said primary circuit directly from said withdrawal pipeline at the exit of said ultrafiltration device.

4. An ultrafiltration device according to claim 2, wherein said filtrate is recycled at a pressure which is approximately 5 bars less than the pressure of said primary water.

* * * * *